Figures 1, 2:
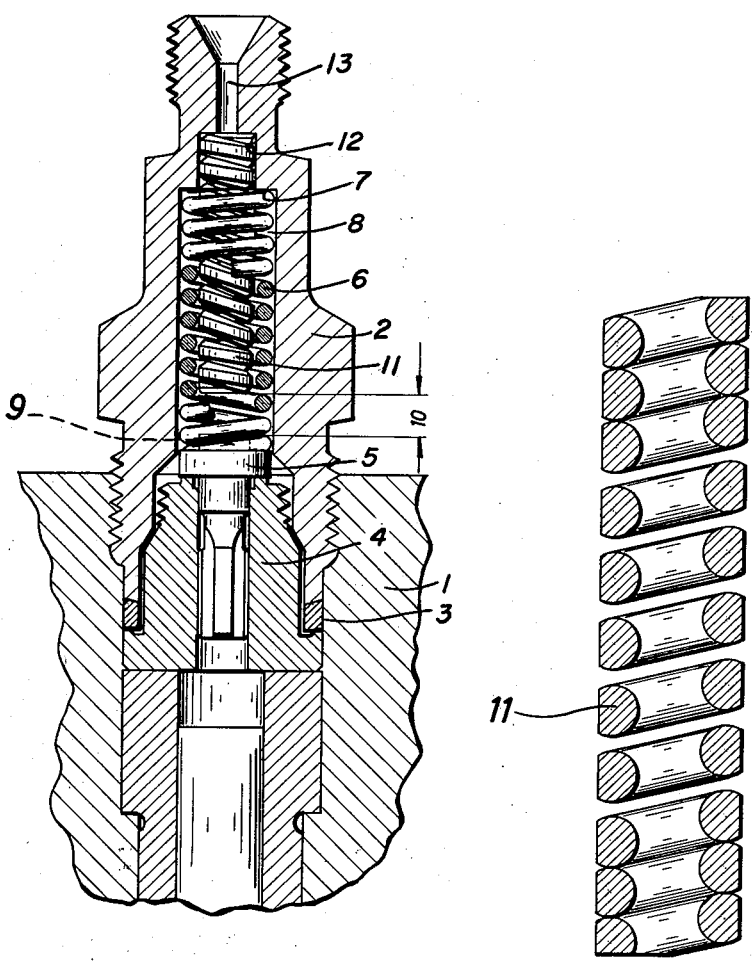

April 28, 1964 H. WEINGÄRTNER 3,130,748
CHECK VALVE FOR FUEL INJECTION PUMPS
Filed Aug. 30, 1961

Inventor
Hans Weingärtner
By Stevens, Davis, Miller & Mosher
Attorneys

United States Patent Office 3,130,748
Patented Apr. 28, 1964

3,130,748
CHECK VALVE FOR FUEL INJECTION PUMPS
Hans Weingärtner, Munich, Germany, assignor to Kugelfischer Georg Schäfer & Co., Schweinfurt, Germany
Filed Aug. 30, 1961, Ser. No. 134,948
Claims priority, application Germany Apr. 17, 1961
3 Claims. (Cl. 137—514)

In the well-known connector for the discharge line of a fuel injection pump including a check valve disposed downstream of the pumping chamber, which connector has an axial recess receiving the spring tending to close the check valve, and an abutment body cooperating with the check valve piston and limiting the travel of the check valve member, the said abutment body has the form of a cylindrical metallic body whose one end is fixedly secured within the connector and whose opposite end faces downwardly, the first-mentioned end being provided with a slot or the like permitting the fuel to flow to the discharge line. When the check valve piston, during the pressure stroke of the pump plunger, hits an abutment body of this construction with a high amount of kinetic energy applied to the free end face of the body, the abutment body can only yield in accordance with the inherent elasticity of the material of which the said end face is made. However, in view of the constant operation of the abutment member and the strong forces introduced into it, the inherent resilience of the material is insufficient to prevent deformation and even failure of the abutment member in a reliable manner.

According to the present invention, these drawbacks of the aforementioned connector are avoided by providing, as an abutment member, a strong helical spring whose one end is fixedly mounted within the connector body, the free end face of the helical spring serving as an abutment surface for the check valve. Thus, according to the invention, the kinetic energy of the check valve member striking the abutment spring is always dissipated by an elastic deformation of the spring, this deformation being small in view of the high spring rate selected for the spring. As a result of this arrangement, it is impossible for the abutment member to be subject to permanent deformation or even failure. Moreover, it is no longer necessary to provide the abutment member with a slot or the like, as it is possible for the fuel to flow between the turns of the abutment spring towards the bore of the connector body leading to the discharge line.

According to another feature of the invention, the abutment member is attached to the connector body in a particularly simple manner by the provision of an interference fit between one end of the abutment spring and a portion of reduced diameter of the axial recess of the connector body. For this purpose, the turns of the abutment spring forming the end of the spring secured in the said portion of the recess may bear on one another without any intervening clearance. The procedure of assembling a connector according to the invention may be simplified by the provision of an abutment spring having a set of mutually abutting turns at both ends thereof so as to render it unnecessary, during insertion of the spring into the connector body, to exercise special care to introduce the correct end of the spring into the reduced diameter portion of the recess of the connector body. Furthermore, at least those turns of the spring which are intended to cooperate with the said portion of the recess by an interference fit may have their outer peripheries flattened so as to form a cylindrical surface, this feature being provided in view of the fact that in many cases a mere line contact between the spring coils and the wall of the recess would not be sufficient to provide the desired interference fit.

Other objects and features of the invention will become apparent as the description proceeds, especially when taken in conjunction with the accompanying drawing, illustrating a preferred embodiment of the invention, wherein:

FIG. 1 is a longitudinal sectional view of an embodiembodiment of the connector of the invention; and FIG. 2 is a longitudinal sectional view of the abutment spring provided according to the invention.

As will be seen from FIG. 1, a connector body 2 for the discharge line (not shown) leading to a fuel injector is threaded into the injection pump body, the lower end of the injector body engaging a sealing ring 3 so as to force the check valve body 4 against the upper face of pump barrel partially shown in the drawing. The valve member 5 of the check valve of per se known construction is acted upon by a valve closing spring 6 one end of which bears upon an internal shoulder 7 provided within the axial recess 8 of the connector body 2, the opposite end of the spring abutting the upper end face of the valve member 5, the lower end of the spring being guided by a pilot portion of the valve member indicated in dash lines at 9 in FIG. 1.

The abutment member serving to limit the length of stroke 10 of the check valve is constituted by an extremely stiff helical spring 11 one end of which is an interference fit in the reduced diameter portion 12 of the axial recess 8, the opposite end face of spring 11 being separated from the upper face of pilot 9 by the distance 10. In order to ensure the necessary interference fit, several coils of the spring 11 are pressed together at both ends so as to be in mutual contact as shown in FIG. 2. Such compressed coils are provided at both ends of the spring 11 so as to eliminate the necessity of orienting the spring in any particular way during insertion thereof into the connector body. In addition, the outer peripheries of the spring coils are flattened to provide a cylindrical surface, this ensuring surface-to-surface contact along the wall of the terminal portion 12 of the recess 8 in the connector body.

During operation of the fuel injection pump, when the pump plunger performs its pressure or delivery stroke, the check valve member 5 is opened against the action of the relatively weak valve closing spring 6, the valve member being lifted until it strikes the lower end face of the abutment spring 11 through the medium of the upper end face of the pilot portion 9. Whilst the spring rate of the valve closing spring 6 amounts, for example, to between 34 pounds per inch and 84 pounds per inch, the rate of the stiff abutment spring 11 is, for example, 1500 pounds per inch. Thus, the kinetic energy of the check valve member 5 striking the spring 11 will produce only a very small spring travel during which the kinetic energy dissipated. Since the spring 11 will always be fully relieved upon the check valve member being returned to its seat, the length of stroke of the check valve is maintained constant, and there is no risk of the abutment spring being subject to permanent deformation or failure. The fuel entering the bore 8 upon the check valve 5 being opened, will first pass between the coils of the valve closing spring 6 and then between the coils of the abutment spring 11 so as finally to enter the bore 13 of the connector body leading to the discharge line which, in turn, leads to the fuel injector.

What is claimed is:

1. A valve structure for a fuel injection pump and the like comprising a body with an axial bore therein having an annular shoulder thereon a valve seat at an end of said bore, a valve disc member in said bore adapted to lift off the valve seat, a first helical spring member having one end seated on said shoulder and its opposite end seated on said valve member to bias it against the valve seat, said bore having a reduced cross-section in the end thereof away from said valve member and ajacent said annular shoulder, a second helical spring member disposed in said bore and extending through said first spring member, said second spring member having one end secured within said reduced section by an interference fit therein, the opposite end of said second spring member being spaced from said valve member when it is seated, the individual spirals of said second spring member in said reduced cross-section and on the opposite end thereof being compressed and lying against each other, said second spring member limiting the lift of said valve member off its seat and acting as a resilient abutment member to prevent damage to the valve and body from frequent impact.

2. The structure of claim 1 wherein said spirals have their outer peripheries flattened to present a cylindrical surface for easy press fitting with said reduced cross-section.

3. The structure of claim 2 wherein the compression and closing rate of said first spring member is between 34 and 84 p.s.i., and said rate for said second spring member is approximately 1500 p.s.i.

References Cited in the file of this patent

UNITED STATES PATENTS

| | | |
|---|---|---|
| 278,270 | Reynolds | May 22, 1883 |
| 507,901 | Grist | Oct. 31, 1893 |
| 722,671 | Burger | Mar. 17, 1903 |
| 731,218 | Perkins | June 16, 1903 |
| 898,659 | Kuehl | Sept. 15, 1908 |
| 1,768,807 | Thompson | July 1, 1930 |
| 2,131,928 | Abegg | Oct. 4, 1938 |
| 2,431,769 | Parker | Dec. 2, 1947 |
| 2,871,796 | Dreisin et al. | Feb. 3, 1959 |
| 2,961,971 | Minett et al. | Nov. 29, 1960 |